Figure 1:
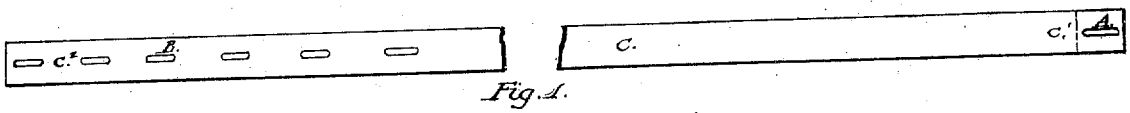

G. N. Beard,

Bale Tie.

No. 2,548. Reissued Apr. 9. 1867.

Witnesses:
David H. Abel
Chas. H. Boyles

Inventor:
G. N. Beard
by M. Randolph & Hobson Attys.

N. PETERS, PHOTO-LITHOGRAPHER, WASHINGTON, D. C.

UNITED STATES PATENT OFFICE.

G. N. BEARD, OF ST. LOUIS, MISSOURI.

IMPROVEMENT IN TIES FOR COTTON-BALES.

Specification forming part of Letters Patent No. 32,818, dated July 16, 1861; reissue No. 2,548, dated April 9, 1867.

*To all whom it may concern:*

Be it known that I, G. N. BEARD, of the city of St. Louis, county of St. Louis, State of Missouri, have invented certain new and useful improvements in metallic ties or locks of bands or hoops for packages and bales of material, such as hemp, cotton, &c., for which, under the name of "Improvement in Iron Ties for Cotton-Bales," Letters Patent of the United States were granted unto me, bearing date the 16th day of July, 1861; and, whereas said Letters Patent are believed to be inoperative by reason of an insufficient description and specification, I do hereby declare that the following is a full, clear, and exact description of the principle or character which distinguishes the said invention from all other things before known, and of the manner of constructing and using the same, reference being had to the accompanying drawings and to the letters of reference thereon.

It is well known that, for convenience and economy in storage and transportation of such materials as hemp, cotton, and rags, &c., these are usually compressed to form packages or bales of a comparatively small compass; and that to retain such compressed materials in said dimensions metallic bands, or hoops are used, encircling said packages or bales, and confining the material thereof to the compass aforesaid; and that, as said bands or hoops are usually long strips of metal, the ends whereof are joined by some device to enable the band to act as though it were endless, and resist, by its full strength, the expansive forces of the material encircled by it.

Now, my said invention relates to the formation of a proper union or connection between the ends of every band, to insure the effective action of the band when on the package, as aforesaid; and my said invention relates, moreover, to an adjustable arrangement of said union or connection, to insure the proper fit of the band upon the package, by the proper agreement of the inner compass of the band with the outer circumference of the bale or package.

It will thus be seen that my said invention may fitly be termed both a "hoop-lock" and a metallic tie for bales of cotton, hemp, rags, &c.

To enable my said invention to properly resist, without disarrangement or damage, the great expansive forces of the compressed material; to enable the same to resist properly the sundry and various strains of compression, contusion, and concussion occurring in handling, transporting, and storing the packages and bales encircled and bound by the same; and for the general purposes of forming an improved and more highly useful hoop-lock and bale-tie, the nature of my invention is in the application of two devices, to wit: a cleat, hook, or button, and a mortise, or any number of either or both of said devices, the manner of said application being, however, as hereinafter fully distinguished and described.

If the ends of a hoop or band are supposed in position one over the other, the greatest linear dimensions of the band being in a horizontal plane, then in the ties previous to my said invention a cleat was secured to one of said ends, which, by a vertical motion (and that solely) could be passed partly through a proper mortise in the other end of said band; then, by the expansive tendencies of the packages encircled by the band, the ends hereof were drawn in such direction that a projecting prong of said cleat hooked over a part of the mortised band. In this position, therefore, the ends of the band could not be drawn apart vertically, beccause of said projecting prong on the one side, and the metal of either of said bands on the other side.

Now, it is plain that whenever, owing to concussion, contusion, or excessive compression in storage, transportation, &c., the package was so affected as to overcome the expansive tendencies and strains of the material, then the ends of the bands, owing to the sundry and various causes, might change their relative position, so as to release said projecting prong of said cleat from its action upon the mortised band; and that then (in the precisely reverse manner in which the cleat was first passed partly through the mortise) the cleat may withdraw vertically from the mortise, if thereto impelled. It is then a characteristic feature of this form of tie that motion in one (elementary) direction only of one end of the band is needed to pass the cleat partly into the mortise, and this direction is perpendicular to the surface of the greatest dimensions of the band. Moreover, that motion in a direction perpendicular to the direction of the first motion was needed to secure the tie, as aforesaid, this motion being usually in the direction of the length of the band. Therefore, whenever, in handling, carrying, or storing the bales or packages thus bound around, the ends of any band were caused to perform the said motions in the reverse order and reverse directions, the tie became unfastened or unlocked, and damage and waste of material resulted therefrom.

In order, now, to remedy the defects here enumerated, the nature of my invention is in the relative arrangement of the cleat and mortise devices, in such wise that either end of the band containing the same must be submitted to motion in at least two elementary directions before the said cleat can pass partly through said mortise. If the ends of any band be placed one above the other, the surface of greatest dimensions lying in a horizontal plane, then one of said motions will be either of the following, to wit: first, motion in a transverse direction of one end of the band over the other, in the same horizontal plane of the first position, thus twisting or turning the band about a vertical axis; secondly, motion in a vertical direction, thereby turning either end of the band about a horizontal transverse axis; thirdly, rotary or twisting motion about a horizontal longitudinal axis, thus depressing one edge and elevating the opposite longitudinal edge of the band then distorted—in all of said cases, the other motion being a vertical one, causing the cleat to pass directly into position within the mortise, to be thereupon drawn to a proper bearing by the expansive action of the bound material.

As the object of the first motion to which the end of the band is subject is to bring the cleat device into such position that, by the second motion, the same may partly pass into the proper mortise, the said first motion will determine the relative shape of the cleat and mortise devices.

It is now plain that, to withdraw the ends of a band thus secured from the connection made in accordance with the nature of my invention, the ends of the band must perform relatively to each other the three motions first performed in securing the tie, and said motions must be performed in the reverse order and reverse directions to the order and directions of their first performance. In the nature of the case, it is apparent that the usual causes of contusion, concussion, or compression of bales will never, or only in rare intervals, cause the proper movements of the ends of the band to effect an untying or unlocking thereof; and it is, moreover, clear that—especially as the compression of a bale or package may cause a return longitudinal motion, releasing the prong of a cleat from the mortise, and especially as incidental causes can easily lift said cleated end, or the end mortised vertically—the great security of this tie or lock is in the application and use of such relative shape and form of cleat and mortise as necessitates, besides said motions just mentioned, either of the third motions first above described.

Figure 3:
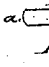
Figure 4:
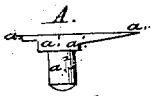
Figure 5:
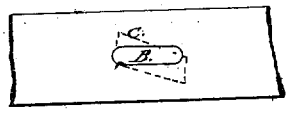
Figure 2:
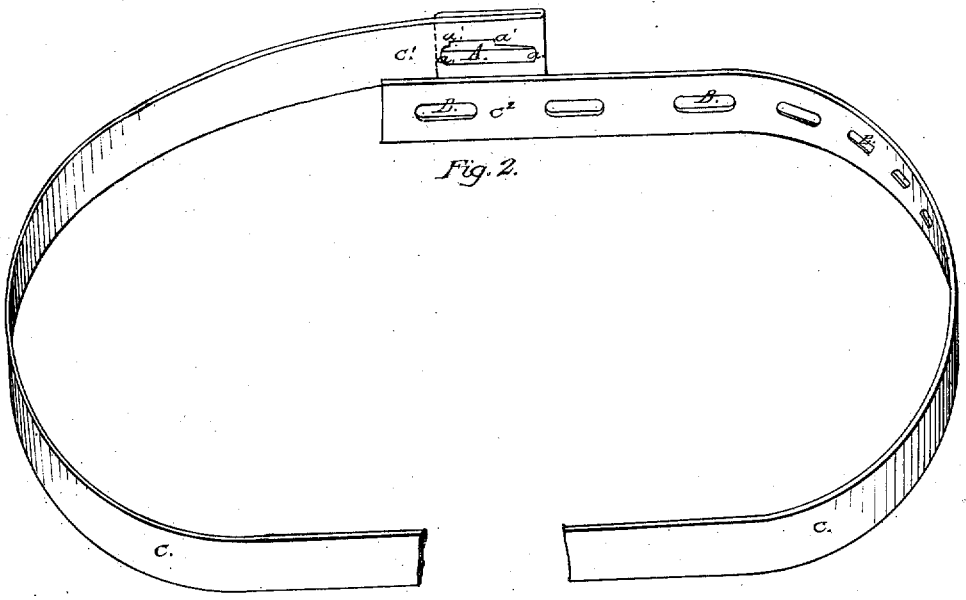

In order, now, that those skilled in the arts may make and successfully apply my said improvement, I will proceed to describe its detail construction and action; and, this to show more clearly, I have given, in Figure 1, a general plan of a hoop or band to show the arrangement of a series of mortises with a single cleat; in Fig. 2, a general perspective view of a hook or band in about its proper curved form, the parts used to form a tie being in one of their relative positions to each other, as will be more specially described; in Figs. 3 and 4, respectively, detail plan and elevation of the cleat or button device in one of its practicable shapes; in Fig. 5, a detail plan of the mortise device.

The several figures 3, 4, and 5 show the parts in about full size, and can therefore be used in practice to guide and direct the mechanic in the proper construction of said improved devices.

Figure 6:
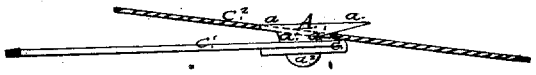
Figure 7:
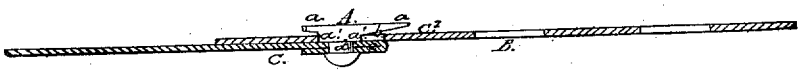

In Fig. 6 I have shown the devices represented in the figures 3, 4, and 5 in their necessary relative position, as assumed in the performance of the first necessary motion or movement of parts, to enable the cleat devices to pass partly into the mortise. In Fig. 7 I have shown the parts when in proper action, forming a tie or lock.

The parts composing my said band are usually wrought and cast iron, the cleat being, however, often made malleable. I generally secure the cleat A by riveting it in one end of the band C. This is not, however, necessary or essential to the nature of my invention. In some cases it may be convenient to form the connection between the cleat A and band C by mortise devices, in a manner entirely similar to that in which said cleat unites with the other end of said band. In the band near the end $C^2$, which is opposite to the end $C^1$, in which the cleat A is secured, I make the mortises B, said mortises being placed at such distances apart that the metallic section of material longitudinally between the same possesses sufficient strength to resist strains received in the band, and the number of mortises being determined by the nature of the processes of compression to which the package is subjected, and the general bulk thereof. Whenever it is desired to use a first motion of the ends of a band, as hereinbefore described, the same being in a vertical direction made by turning either of said ends about a horizontal axis, then I use the general form of cleat and mortise as represented in the figures 3, 4, and 5. The said mortise B being simply an oblong hole, the transverse sides whereof being either straight or rounded, the said cleat having either one or two projecting prongs, *a*, in the direction of the longitudinal axis of the band, the said prongs *a* unite, and in the central body of the cleat give the bearing-surface $a^1$, which connects again with the rivet-shaft $a^2$; or, with a second series of devices, *a*, through either said rivet-shaft $a^2$ or second series of devices *a*, a connection is effected with the end $C^1$. In case this connection is made by riveting, a washer should be placed on $C^1$, or the end $C^1$ be doubled over to give said riveted connection the proper rigidity and security. It will now be seen that the horizontal projection of the greatest surface of the cleat A, measured from *a* to *a*, is greater than the horizontal projection of the mortise length; that, therefore, the cleat cannot be dropped by a merely vertical motion partly through the mortise, as in the ties or locks previous to my said invention. In order, now, to pass said cleat partly through said mortise I turn, for example, the mortised end of the band, being $C^2$, about a horizontal transverse axis, into the position fairly shown in Fig. 6. If, now, the projecting prong *a* is long, a slight horizontal motion may be needed to cause the other prong to pass the contiguous transverse edge of the mortise. The prong edge of said cleat may, however, be so shaped that said horizontal motion is here not needed. If, then, either end of said band is moved vertically to bring the band surface to a contact, the expansive force of the material bound can act upon the band to cause a transverse edge of the cleat—to wit, of the bearing-surface $a^1$—to come to a proper action upon the contiguous edge of the mortise B, when the expansive strain of the encompassed package upon the band is properly resisted, and the tie is complete. If, now, owing to a subsequent necessary or desirable greater compression, the band is to be readjusted, it will be easy, by performing the various motions before performed in creating the tie or lock union of the ends $C^1$ and $C^2$ of the band in a reverse order and in reverse directions, to open the tie first made, and then, in the manner entirely alike to the manner of the first formation of a tie or lock, a second tie or lock may be made by passing the said cleat device A into another one of the mortises B, which shall accommodate the compass of the band to the new circumference of the bale or package. Thus is my said band adjusted to any desirable size or compass of the bale or package. Now, it is usual that the bale after a second compression is of smaller circumference than after a first compression; therefore, the mortised end $C^2$ of the band will, after said second (or after any compression process subsequent to the first) compression, be too long. In order, now, that the part of this end of the band beyond the mortise acted upon by the cleat A may not be wasted I have specially arranged the mortised end $C^2$ under said end $C^1$ of the band. Thus, then, the mortised end not really used for the proper compassing of the bale will be guarded between the outer surface of the bale and the end $C^1$.

Moreover, in this arrangement of the parts aforesaid the cleat A will be so placed that the prongs *a* thereof press against the bale itself, and the outer surface of the band will be smooth, and in no wise likely to rupture or damage in handling the bale. This arrangement of parts is of much importance, as, in the contrary case, the unused end of the band, marked $C^2$, would lie on the upper or outer surface of the band, and would be easily upturned or bent, and injured by incidental forces in handling the package or bale. Moreover the prongs *a* of the cleat protruding beyond, the then outer surface of the band are liable to injury, thereby endangering the security of the tie.

It will be seen, by reference to Fig. 6, that in case the end of the band, marked *c*, were so shortened, the edge *b* of the mortise B might lie immediately upon the end *c*. Then the vertical motion performed after the cleat has passed partly through the mortise B will not be needed, but the rotary motion about a transverse horizontal axis of $C^2$ will place $C^2$ flat upon $C^1$. Generally, however, a slight vertical motion will be necessary to bring the parts $C^1$ and $C^2$ in such proper positions that the expansive force of the package material may draw the prong *a* over the proper edge of the mortise B. Again, it will appear that one of the prongs *a* only may be used, as in full accordance with the nature of my invention.

Now, it will moreover appear that, in case, by motion in a transverse direction of one end of the band over the other in the same horizontal plane of the first position, the cleat A is to be brought into proper position to pass partly through the band mortise B, then the cleat need in no wise be changed; but the mortise will be a parallelogram or trapezoid in horizontal projection, the longitudinal edges of the mortise being no longer parallel to the longitudinal edges of the band.

It may, however, be advantageous to change the form of cleat. This will then be done similarly, by varying the rectangular face of the prongs *a* from a rectangle to a parallelogram or trapezoid. Lastly, in case it is desirable to arrange the parts so that by a first motion of twisting about a horizontal longitudinal axis of the band, thus depressing one longitudinal edge and raising the other, the cleat A may pass partly through said mortise B; then the projecting prong or prongs *a* will be at the side of the shaft $a^2$ of the cleat, being thus a transverse extension of the cleat instead of a longitudinal one, as shown in the drawings.

In all of said cases, however, the advantage will fully obtain, as before described, of passing an unused extension of the end $C^2$ of the band under the end $C^1$ to protect the same. It is now also plain that in the same manner in which the end $C^2$ was tied to the cleat A the end $C^1$ of the band may be joined, and that a number of cleat devices, with corresponding mortise devices, may be applied to join and secure the parts.

Having thus fully described my invention, I do not claim the use of a cleat or mortise device, or both, nor forming said cleat with one or more prongs; but what I do claim and wish to secure by Letters Patent of the United States, is—

1. The shape and proportion of the cleat device A with respect to the loop-holes B, substantially as herein set forth.

2. The fixed combination of a double-hooked cleat, having prongs or engaging points of unequal length, with one end of a metallic band, having an elongated aperture in its other end, when the length of said aperture is less than the united diameter of the shank of said cleat and length of its longer prong, all substantially in the manner and for the purpose herein set forth.

In testimony of which invention I hereunto set my hand and seal this 13th day of September, A. D. 1866.

G. N. BEARD. [L. S.]

Witnesses:
GEORGE P. HERTHEL, Jr.,
M. RANDOLPH.